United States Patent
Phukan

(10) Patent No.: US 8,433,782 B2
(45) Date of Patent: Apr. 30, 2013

(54) SIMPLIFYING DETERMINATION OF DEPENDENCIES AMONG SOA SERVICES

(75) Inventor: Sandeep Phukan, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 452 days.

(21) Appl. No.: 12/828,315

(22) Filed: Jul. 1, 2010

(65) Prior Publication Data

US 2011/0246635 A1 Oct. 6, 2011

Related U.S. Application Data

(60) Provisional application No. 61/321,152, filed on Apr. 6, 2010.

(51) Int. Cl.
*G06F 15/173* (2006.01)

(52) U.S. Cl.
USPC .......................................................... 709/223

(58) Field of Classification Search .................... 709/223
See application file for complete search history.

(56) References Cited

U.S. PATENT DOCUMENTS

| | | |
|---|---|---|
| 7,627,671 B1 | 12/2009 | Palma et al. |
| 2004/0049509 A1* | 3/2004 | Keller et al. .................. 707/100 |
| 2008/0144529 A1* | 6/2008 | McKee et al. .................. 370/254 |
| 2008/0222287 A1 | 9/2008 | Bahl et al. |
| 2009/0171731 A1 | 7/2009 | Bobak |
| 2009/0204696 A1 | 8/2009 | Zhang et al. |
| 2009/0281845 A1 | 11/2009 | Fukuda et al. |

FOREIGN PATENT DOCUMENTS

| | | |
|---|---|---|
| WO | 2004079534 A2 | 9/2004 |
| WO | 2007028134 A2 | 3/2007 |

OTHER PUBLICATIONS

"Abrehet M.Omer", "Dependency Based Automatic Service Composition Using Directed Graph", IEEE Computer Society, 2009 Fifth International Conference on Next Generation Web Service Practices, Published: Sep. 10, 2009, p. 1-6.

"Reiko Heckel", "Behavioral Refinement of Graph Transformation-Based Models", Workshop on Software Evolution through Transformations, vol. 127 of Electr. Notes Theory. Computer. Sci., Issue Date: 2005, p. 1-10.

"Shuying Yan", "An Approach to Discover Dependencies Between Service Operations", Academic Publishers, Journal of Software vol. 3, No. 9 (2008), Special Issue Date: Dec. 9, 2008, p. 36-43.

"SOA Portfolio Manager", "SOA Software Inc", http://www.soa.com//products/portfolio_manager_capabilities#gpda, Downloaded circa: Mar. 23, 2010, p. 1-2.

"Sujoy Basu", "Toward Web Service Dependency Discovery for SOA Management", IEEE Computer Society, 2008 IEEE International Conference on Service Computing, Issue date: Sep. 10, 2009, p. 1-8.

* cited by examiner

*Primary Examiner* — Hee Soo Kim
(74) *Attorney, Agent, or Firm* — Narendra Reddy Thappeta

(57) ABSTRACT

According to an aspect of the present disclosure, artifacts representing SOA services are statically inspected to determine a set of dependencies among the SOA services. The determined set of dependencies is provided to users to facilitate analysis of dependencies among the SOA services. According to another aspect of the present disclosure, such set of dependencies are displayed in the form of a graph.

17 Claims, 7 Drawing Sheets

SIMPLIFYING DETERMINATION OF DEPENDENCIES AMONG SOA SERVICES

RELATED APPLICATIONS

The present application is related to and claims priority from the U.S. provisional patent application entitled, "GRAPH BASED SOA DESIGNTIME DEPENDENCY", Ser. No. 61/321,152, Filed: 6 Apr. 2010, Applicant: Oracle International Corporation, naming the same inventor Sandeep Phukan as in the subject patent application, and is incorporated in its entirety herewith.

BACKGROUND OF THE INVENTION

1. Technical Field

The present disclosure relates to enterprise service architecture, and more specifically to simplifying determination of dependencies among service oriented architecture (SOA) services.

2. Related Art

Computing environments are often implemented based on Service Oriented Architecture (SOA). In a SOA environment, server systems (in general, provider systems) provide a set of services (referred to as "SOA services") which can be invoked by other consumer systems via a network using well defined protocols such as SOAP over Hypertext Transfer Protocol (HTTP).

SOA services are defined by a corresponding contract, which specifies input/output parameters of the service, the type of the parameters, the format of invoking the service (sending the request), the format of the response, etc. The contract is specified in a structured format such as extensible markup language (XML), which makes the content machine-understandable. As is well known, the contracts for SOA services are often specified according to Web Service Definition Language (WSDL).

Client/consumer systems can request contracts of desired SOA services and then invoke the SOA services according to the received specification. In general, a client/consumer system invokes one or more services (to perform desired tasks on or using the provider systems) and receives corresponding responses.

There is a general need to determine the dependencies among the SOA services present in a SOA environment. For example, dependencies may need to be determined to identify bottlenecks, cyclic dependencies and missing services during the design of the SOA services. Such dependency information may also facilitate a user/developer to determine the impact of a change in the implementation/contract of a specific SOA service on the other SOA services in the environment.

BRIEF DESCRIPTION OF THE DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

According to an aspect of the present disclosure, artifacts representing SOA services are statically inspected to determine a set of dependencies among the SOA services. The determined set of dependencies is provided to users to facilitate analysis of dependencies among the SOA services.

According to another aspect of the present disclosure, a set of dependencies among SOA services are displayed in the form of a graph.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
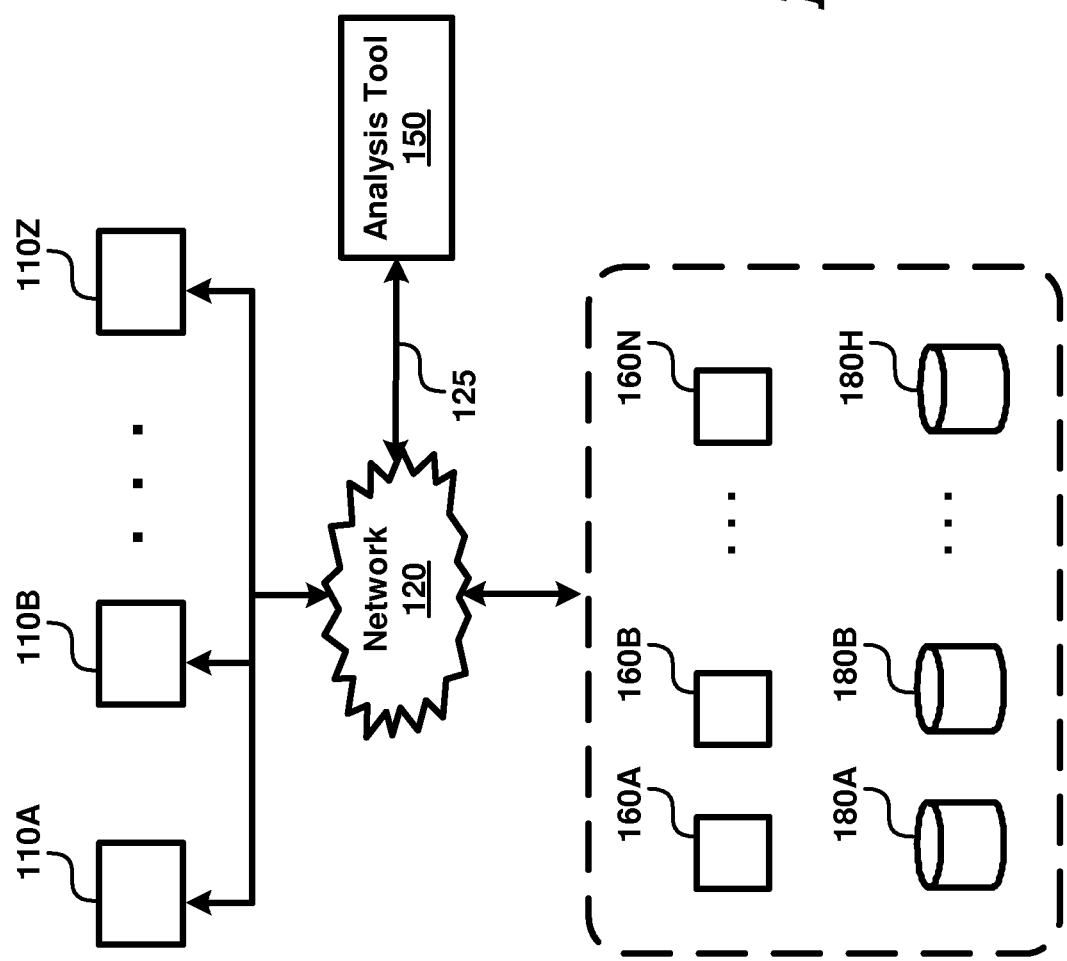
FIG. 1 is a block diagram illustrating an example environment (computing system) in which several aspects of the present invention can be implemented.

FIG. 1 is a block diagram illustrating an example environment (computing system) in which several aspects of the present invention can be implemented. The block diagram is shown containing user systems 110A-110Z, network 120, analysis tool 150, server systems 160A-160N and data stores 180A-180H.

Merely for illustration, only representative number/type of systems is shown in FIG. 1. Many environments often contain many more systems, both in number and type, depending on the purpose for which the environment is designed. Each system/device of FIG. 1 is described below in further detail.

Network 120 provides connectivity between user systems 110A-110Z, analysis tool 150, server systems 160A-160N and data stores 180A-180H (shown within an enterprise, as indicated by the dotted boundary). Network 120 may be implemented using protocols such as Transmission Control Protocol (TCP) and/or Internet Protocol (IP), well known in the relevant arts. In general, in TCP/IP environments, a IP packet is used as a basic unit of transport, with the source address being set to the IP address assigned to the source system from which the packet originates and the destination address set to the IP address of the target system to which the packet is to be eventually delivered. An IP packet is said to be directed to a target system when the destination IP address of the packet is set to the IP address of the target system, such that the packet is eventually delivered to the target system by network 120.

Each of user systems 110A-110Z represents a system such as a personal computer, workstation, mobile device (e.g., cell phone), etc., used by users to generate requests for invocation of SOA services to the provider systems providing the SOA services, such as server systems 160A-160N. The requests may be generated using appropriate user interfaces. In general, a user system sends requests invoking SOA services for performing specific tasks and receives as corresponding responses the results of performance of the requested tasks. Each request is sent in the form of an IP packet directed to the desired server system (providing the SOA service), with the IP packet including data identifying the requested SOA service in the payload portion.

Each of data stores 180A-180H represents a non-volatile (persistent) storage facilitating storage and retrieval of a collection of data by applications executing in server systems 160A-160N. Some of data stores 180A-180H may be implemented as a corresponding database server using relational database technologies and accordingly providing storage and retrieval of data using structured queries such as SQL (Structured Query Language). Some of data stores 180A-180H may be implemented as a corresponding file server providing storage and retrieval of data in the form of files organized as one or more directories, as is well known in the relevant arts.

Each of server systems 160A-160N represents a server, such as a web/application server, capable of providing SOA services to users using user systems 110A-110N. In general, a server system receives a request invoking a service for performing a desired task from one of user systems 110A-110N, performs the tasks on data maintained internally or on external data (for example, stored in data stores 180A-180H) and then sends the result of performance of the tasks to the requesting user system as a corresponding response to the invocation request.

Thus, the environment of FIG. 1 may be viewed as a SOA environment, in which user systems 110A-110Z may be viewed as consumer systems consuming SOA services and server systems 160A-160N may be viewed as provider systems (providing SOA services). Examples of such SOA services are enterprise service bus (ESB) services which facilitate routing of requests/responses between consumer and provider systems, business process execution language (BPEL) services used to orchestrate (perform together) one or more SOA services provided by the provider systems, etc.

In general, SOA services are implemented in the form of artifacts (in the provider systems). Each SOA artifact typically contains program logic implementing one or more of such services. An artifact is typically made available at a corresponding Uniform Resource Locator (URL), and the requests (sent by consumer systems) contain additional data to indicate the specific service in case more than one service is implemented by the artifact, as is well known in the relevant arts. The general SOA architecture in an example scenario is described below.

3. Example SOA Architecture

Figure 2:
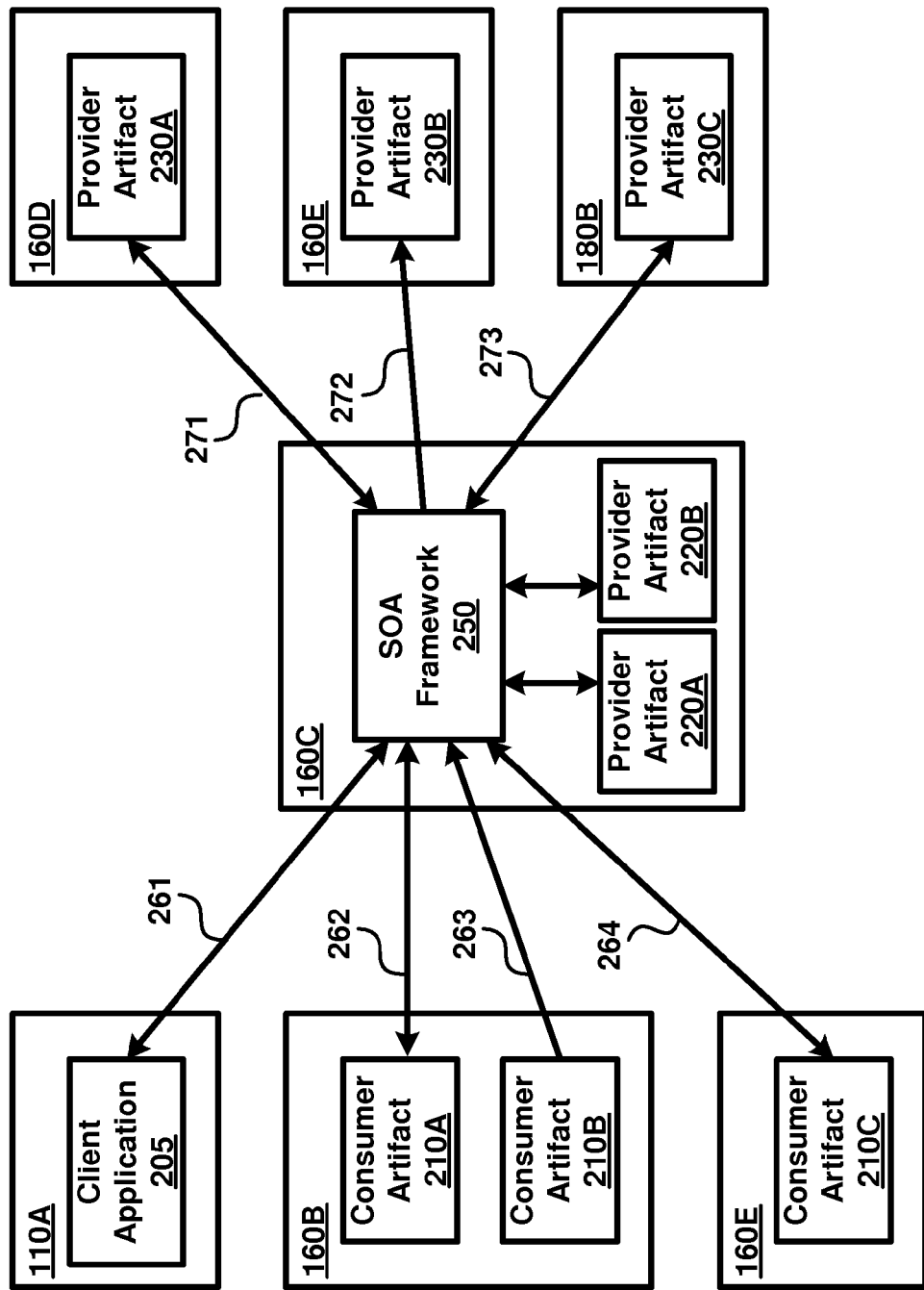
FIG. 2 is a block diagram illustrating the manner in which SOA services are provided in one embodiment.

FIG. 2 is a block diagram illustrating the manner in which SOA services are provided in one embodiment. The block diagram is shown containing the some of the systems of FIG. 1 (110A, 160B-160E and 180B) deployed with corresponding SOA related executable modules.

Client application 205 executing in user system 110A sends a request for invoking a SOA service provided by server system 160C and receives a corresponding response (shown by two way interaction 261). The requests and responses are according to a contract (e.g., specified in a WSDL) of the invoked SOA service. Consumer artifacts 210A-210B representing applications executing in server system 160B may also send requests for invoking SOA services provided by server 160C (interactions 262 and 263).

SOA framework 250, executing in server system 160C, facilitates SOA artifacts (such as 220A-220B) to be deployed and the corresponding SOA services to be provided to consumers (such as client application 205). SOA frameworks simplify programmer complexity by operating based on declarative statements, which merely need to indicate what SOA services are provided (by an artifact) and which SOA services (provided by same or other server systems) are to be invoked by a provided SOA service.

Thus, additional low level detail such as the manner of establishing connection to the other server systems, error handling, logging, type of details, are not required to be specified by the programmers of the specific SOA services. In other words, such detail need not be present in the SOA artifacts representing the corresponding SOA services. An example product providing a SOA framework is "Oracle Application Server" available from Oracle Corporation, the (intended) assignee of the subject patent application.

During run time, to process requests, SOA framework 250 examines declarations in the deployed artifacts (220A-220B) to determine any further services to be invoked. Such invocation of further SOA services may be required, for example, when the provided SOA service is of type ESB service or BPEL service. SOA framework may be executing on one or more of server systems 160A-160N, though shown only in server system 160C (for conciseness).

Thus, SOA framework 250 is shown invoking the services provided by provider artifacts 230A-230C (deployed respectively in systems 160D, 160E and 180B) based on the declarations in artifacts 220A and 220B. SOA framework 250 also may receive the responses from the provider artifacts as shown by interactions 271-273 and may forward the responses to the consumers (such as client application 205). The services provided by provide artifacts 230A-230C may be one of adapter service, external service, routing service, abstract WSDL, BPEL service, and ESB service. It should be appreciated that some of the provider artifacts (for example, 230B providing a BPEL/ESB service) may also operate as consumer artifacts (e.g., consumer artifact 210C shown deployed in system 160E and performing interaction 264).

At least based on the general operation described above, it should be appreciated that complex SOA based environments can have a mesh of SOA services and corresponding artifacts, which are inter-dependent. Accordingly, there is a general need for users to know the dependencies among such a mesh of SOA services.

In a prior approach, users had to manually view the instruction/statements of the artifacts to determine the dependencies. Such manual approaches may not scale to complex environments in view of the large fan-out (different SOA services possible to be invoked) in each SOA artifact, as well as the SOA services being deployed on different server systems.

Several aspects of the present invention simplify the determination of dependencies among SOA services, as described below in further detail.

4. Simplifying Determination of Dependencies Among SOA Services

Figure 3:
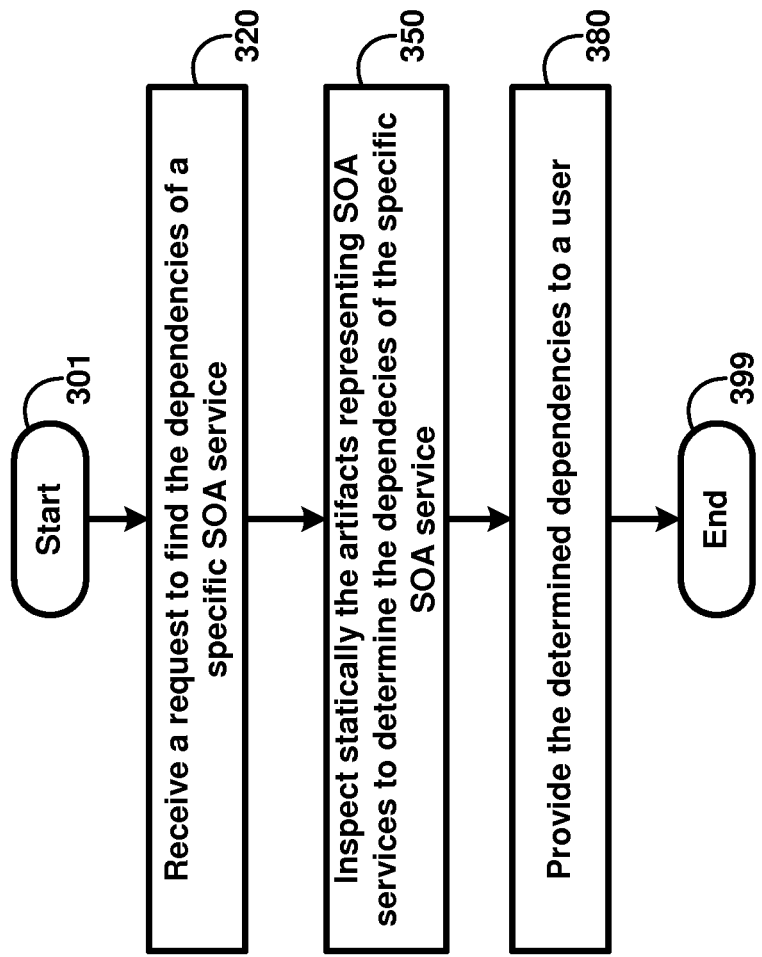
FIG. 3 is a flow chart illustrating the manner in which determination of dependencies among SOA services is simplified according to an aspect of the present invention.

FIG. 3 is a flow chart illustrating the manner in which determination of dependencies among SOA services is simplified according to an aspect of the present invention. The flowchart is described with respect to FIGS. 1 and 2 merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 301, in which control immediately passes to step 310.

In step 320, analysis tool 150 receives a request to find the dependencies of a specific SOA service. For example, assuming that a user encountered/experienced a problem with receiving response after sending a request to invoke a service provided by a SOA service corresponding to artifact 220A, that SOA service may be indicated in the request. The SOA service may be indicated by a URL at which the service is invoked or by the URL at which the contract of the service can be accessed.

In step 350, analysis tool 150 inspects statically the (deployed) artifacts representing SOA services to determine the dependencies of the specific SOA service. It should be appreciated that (SOA service corresponding to) artifact 220A is said to be dependent on the (SOA service corresponding to) artifacts 230A/230B assuming the declarative statements in artifact 220A specify that the SOA services corresponding to artifacts 230A/230B are to be invoked.

'Statically' implies that the step is not performed during run-time, and/or the (declarative) statements in the artifacts are examined for determining the dependencies. It may be appreciated that SOA framework 250 may examine the artifacts during run-time to determine the SOA services to be invoked, but such examination may not need to identify all the possible services that are defined to possibly be invoked in the artifact.

In step 380, analysis tool 150 provides the determined dependencies to a user. For example, the dependencies among the SOA services may be displayed in the form of graph with the determined dependencies represented as edges between corresponding services represented as nodes. The flowchart ends in step 399.

Thus, by statically inspecting the statements in the SOA artifacts, analysis tool 150 simplifies the determination of the dependencies among the SOA services (represented by the SOA artifacts). A sample set of dependencies that may be determined by analysis tool 150 is described below with examples.

5. Sample Dependencies

Figure 4:
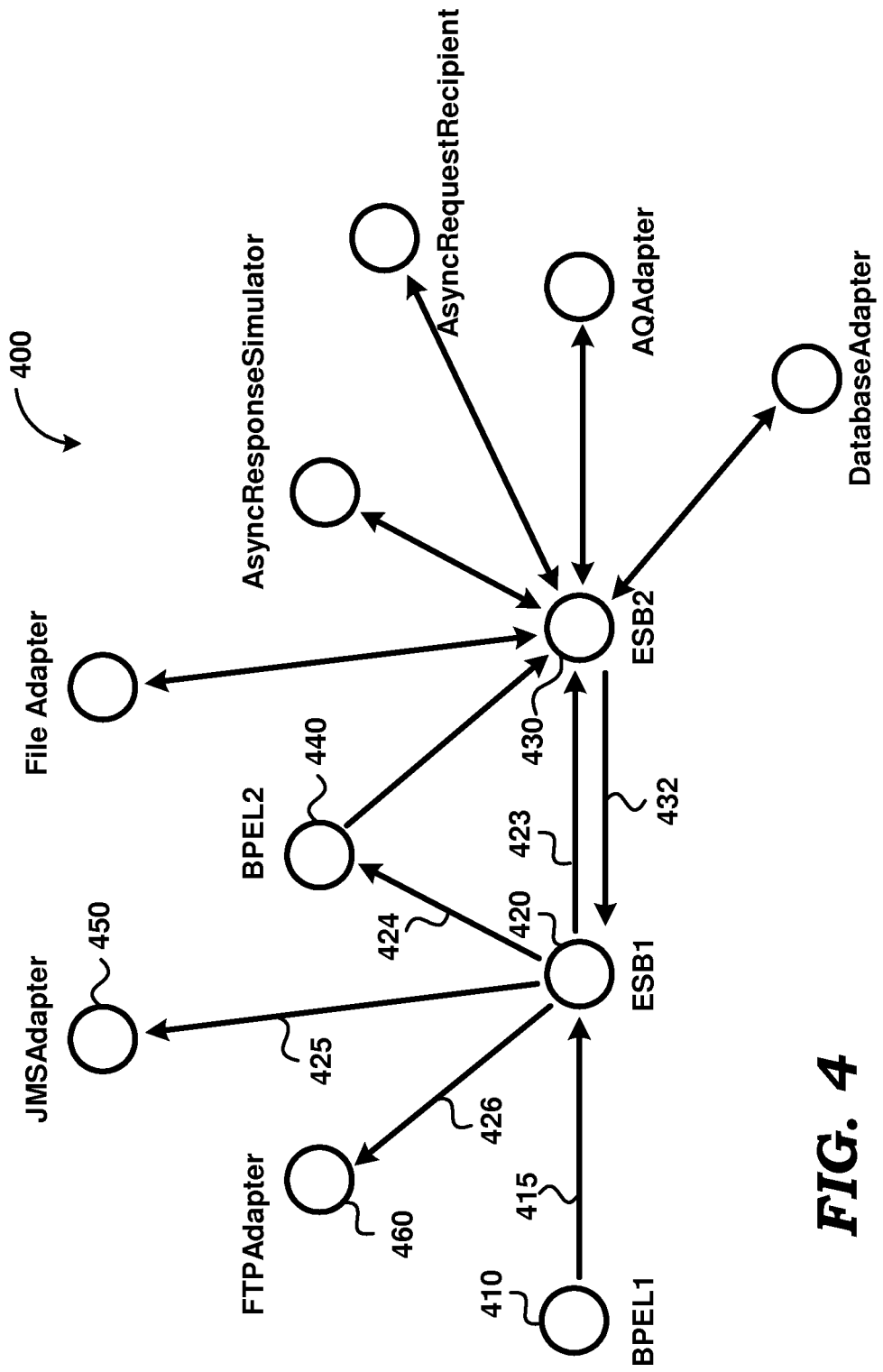
FIG. 4 depicts a set of dependencies determined among SOA services in one embodiment.

FIG. 4 depicts a set of dependencies determined among SOA services in one embodiment. For illustration, the set of dependencies are shown in the form of a graph. However, in alternative embodiments, the dependencies may be represented using other data structures such as trees, maps, etc. as will be apparent to one skilled in the relevant arts by reading the disclosure provided herein.

Graph 400 depicts the dependencies determined among a set of SOA services, with the dependencies represented as edges (such as 412, 423, etc.) and the corresponding SOA services represented as nodes (such as 410, 420, etc.). The nodes of graph 400 are labeled by the names of the corresponding SOA services, while the direction of the edges specify whether the interactions between the services is one-way (only request) or two-way (having both request and response). In the following description, the artifacts representing/providing the corresponding services are also referred to by the respective service names.

Graph 400 represents the set of dependencies for the BPEL1 service (node 410). Edge 412 between nodes 410 and 420 (corresponding to the service ESB1) indicated that the ESB1 service is defined to be invoked according to the statements in the BPEL1 artifact. Nodes 430, 440, 450 and 460 and the corresponding edges 423-426 indicate that the corresponding ESB2, BPEL2, JMSAdapter, and FTPAdapter services are defined to be invoked according to the statements in the ESB2 artifact. The other nodes/edges similarly indicate the other dependencies determined by inspecting the artifacts corresponding to the services. It may be noted that edge 432 indicates that service ESB1 is invoked by service ESB2 (according to the statements in the ESB2 artifact) while edge 423 indicates that service ESB2 is invoked by service ESB1 as described above.

It may be appreciated that graph 400 may be generated by analysis tool 150 in response to a request to find the dependencies for the BPEL1 service (node 410). The request may be received when a user is experiencing a problem with receiving responses after sending requests for invoking the BPEL1 service (and accordingly node 410 may represent provider artifact 220A). Analysis tool 150 may then provide graph 400 as a response to the request, thereby enabling the user to determine the potential cause of the problem. For example, the user, by viewing graph 400, may identify that the problem of non-receipt of responses is due to the cyclic dependency (edges 424, 443 and 432) among the ESB1, BPEL2 and ESB2 services.

The manner in which the steps of FIG. 3 may be implemented to determine the dependencies of FIG. 4 is described below with examples.

6. Example Implementation

Figure 5:
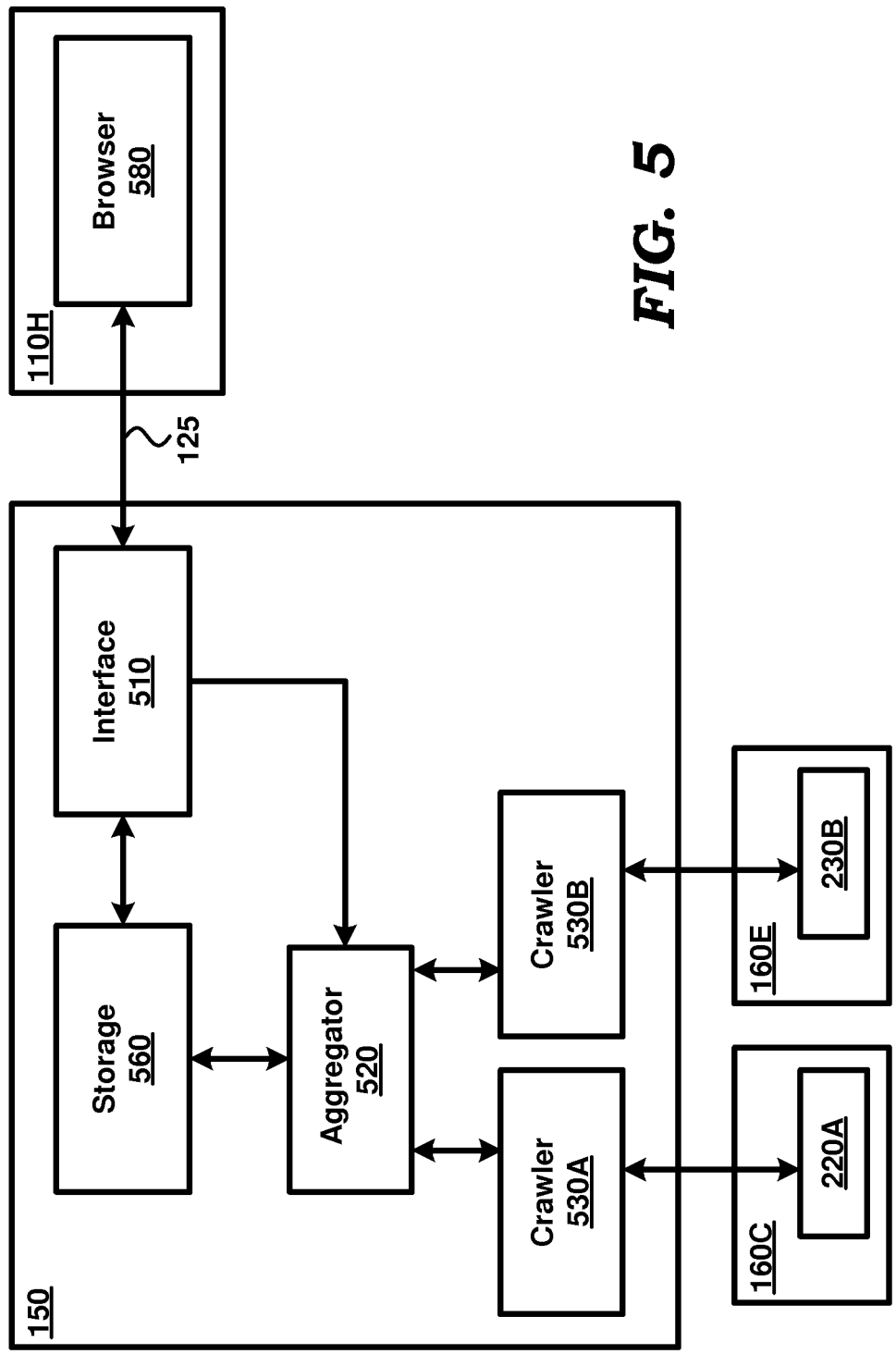
FIG. 5 is a block diagram depicting the manner in which the determination of dependencies among SOA services is implemented in one embodiment.

FIG. 5 is a block diagram depicting the manner in which the determination of dependencies among SOA services is implemented in one embodiment. The block diagram is shown containing interface 510, aggregator 520, crawler 530A-530B, and storage 560, and browser 580. Each of the blocks is described in detail below.

Interface 510 is designed to receive requests for finding dependencies for specific SOA services from users using user systems 110A-110Z (for example, using browser 580) and to provide the dependency information for the requested SOA service to the requesting user system (as corresponding responses to the request). In one embodiment, the request indicates the URL at which the contract (e.g., WSDL) of the specific SOA service is accessible by the consumer systems/artifacts. In response to receiving a request, interface 510 forwards the request including the URL (assumed to be the contract URL for BPEL1 service) to aggregator 520.

Aggregator 520 is designed to determine the set of dependencies of the specific SOA service requested by the user. In one embodiment, aggregator 520 is designed to generate a graph (similar to graph 400) representing the set of dependencies of the requested SOA service.

Accordingly, in response to receiving the request indication from interface 510, aggregator 520 first identifies the type of the current BPEL1 service based on the contract URL indicated in the request. Aggregator 520 may identify whether the type of the current service is one of adapter service, external service, routing service, abstract WSDL, BPEL service, and ESB service. Thus, aggregator 520 may identify BPEL1 service as of type BPEL service based on the contract URL.

Aggregator 520 then adds a node (410) for the current service to the graph. Each of the nodes added in the graph may be associated with the details of the corresponding service such as the name of the service (BPEL1 as shown in FIG. 4), the type of the service (such as routing service, BPEL service, etc.), the URL at which the contract of the service is accessible, the URL at which the service can be invoked, etc.

Aggregator 520 then determines whether the statements in the current artifact (BPEL1) corresponding to the current service need to be inspected. For example, aggregator 520 may check whether the identified type of the current service is one of BPEL service or ESB service, and then determines that the current artifact is to be inspected only if the current service is one of BPEL/ESB type. In the scenario that aggregator 520 determines that an artifact needs to be inspected, aggregator 520 creates an instance of a crawler to perform the inspection. For example, aggregator 520 may create crawler 530A for inspecting the BPEL1 artifact, since the BPEL1 service is of type BPEL. Aggregator 520 may create multiple instances of the crawler to inspect multiple artifacts, though only two are shown for conciseness.

7. Inspecting Artifacts

Each of crawlers' 530A-530B is designed to inspect the statements of an artifact and to determine the services invoked by the artifact. In one embodiment, the crawlers are executed in separate threads, thereby enabling the crawlers to operate concurrently and accordingly reduce the time taken to determine the dependencies of a specific SOA service.

For example, crawler 530A may inspect the statements of BPEL1 artifact to determine the invoked services. As is well known, BPEL services may be specified using instructions according to Java programming language or as declarative statements in the form of tags according to extensible markup language (XML). More information regarding BPEL and the manner in which they may be specified is described in detail in a document entitled, "OASIS BPEL2.0 Primer" widely available from OASIS, Post Office Box 455, Billerica, Mass. 01821, USA, +1 978 667 5115.

Assuming that BPEL services are specified according to XML, crawler 530A may first retrieve the tags/declarations specified in the BPEL1 artifact (provider artifact 220A). Though not shown, crawler 530A may also interact with SOA framework 250 (executing in server system 160C) to retrieve the statements of BPEL1 artifact. Crawler 530A then parses the retrieved tags/declarations to (search for and) identify specific tags that indicate the services invoked by the artifact. For example, crawler 530A may search for (in the declarations) the "partnerLink" tags shown below:

```
<partnerLinks>
    <partnerLink name="client" partnerLinkType="client:BPEL1"
myRole="BPEL1Provider" />
    <partnerLink name="ESB1"
partnerRole="execute_pptProvider"
partnerLinkType="ns1:execute_pptLT" />
</partnerLinks>
```

It may be observed that one of the partner links indicates that the BPEL1 service has the role of a client, while the other partner link indicates a service named "ESB1" that is invoked by the BPEL1 service. As will be appreciated, other services invoked by the BPEL service may similarly be specified (using "partnerLink" tags) and accordingly may be determined by inspection of the statements in the BPEL artifact.

Though not shown, ESB type artifacts may also be inspected (for example by crawler 530B) and the corresponding services invoked by the ESB services may be determined. The description is continued assuming that the ESB artifacts are specified as declarative statements in the form of tags according to extensible markup language (XML). More information regarding ESB and the manner in which they may be specified is described in a document entitled, "Oracle SOA Suite Developer's Guide" by Matt Wright and Antony Reynolds, and available from Oracle Corporation.

Accordingly, crawler 530B may retrieve the tags/declarations specified in the artifact (such as ESB1 provider artifact 230B in server system 160E), and then parse the retrieved tags/declarations to (search for and) identify specific tags that indicate the services invoked by the artifact. For example, crawler 530B may search for (in the declarations) the "service" tags shown below:

```
<service name="InboundFileAdapter_RS"
    guid="B6593322045311DFBF9E0F8"
    qname="sCrawler_ESBSystem.InboundFileAdapter_RS"
    status="ENABLED" serviceType="RoutingService"
    typeDescription="Routing Service" isWSDLEditable="false">
        <parent guid="5AE0F140EFF911DEBF0A4DEF5"
    qname="sCrawler_ESBSystem" type="system" />
        <operations>
        <operationInfo guid="B6593323045311DFBF9E0F8E"
    wsdlOperation="Read" mepDisplayName="One Way"
    qname="sCrawler_ESBSystem.InboundFileAdapter_RS.Read"
    mep="OneWay" />
        </operations>
    </service>
```

It may be observed that the "service" tag is defining that a routing/ESB service (the value of the attribute "serviceType") is to be invoked. As will be appreciated, the "service" tag may occur multiple times corresponding to the different services invoked by the ESB service. Accordingly, crawler 530B may determine the service invoked by the ESB service based on the multiple occurrences of the "service" tag. Crawler 530B may also determine the type of the invoked service based on the value of the attribute "serviceType".

Each crawler then provides a list of invoked services (along with associated information such as type of service, etc.) to aggregator 520 to facilitate determination of the dependencies of the requested SOA service. For example, crawler 530A may provide {ESB1} as the list of services invoked by BPEL1 service based on the BPEL statements (in particular, the partner link tags) shown above.

8. Iterative Inspection

Referring again to FIG. 5, aggregator 520 receives the list of invoked services (based on the inspection of the artifact) for the current service from the crawlers and then adds the invoked services to the graph. In a scenario that the list is empty indicating that the current service does not invoke any other service, aggregator 520 performs no further action for the current service.

In the scenario that the current service is determined to invoke other services (in other words, when the list is not empty), aggregator 520 adds (to the graph) a node for each of the invoked services specified in the list and also edges from the node for the current service to the newly added nodes corresponding to the invoked services.

The edges indicate that the current service is dependent on the invoked services. Each of the edges added in the graph may be associated with the details of the dependency such as the message exchange pattern (MEP) represented by the edge (for example, request-response/two-way, one-way, etc.), a name/description of the interaction between the services, the URLs at which the services can be invoked, etc. The edges may also be associated with other measured parameters such as the average response time for the interaction, etc.

Aggregator 520 then iteratively performs the above noted steps (of determining the type of service, (optionally) adding a node for the current service, determining whether the current artifact needs to be inspected, creating a crawler for inspecting the current artifact (if needed), and adding the nodes/edges for the invoked services identified by the crawler) for each of the invoked services, thereby ensuring that all the dependencies of the requested SOA service are determined.

For example, aggregator 520 may perform the above noted steps with ESB1 as the current service, and accordingly may determine (using crawler 530B) that the ESB1 service is defined (based on the "service" tags) to invoke ESB2, BPEL2, JMSAdapter and FTPAdapter services. Aggregator 520 may then add nodes 430, 440, 450 and 460 and also edges 423-426 corresponding to the invoked services and then perform the above noted steps for each of the invoked services. Thus, for JMSAdapter and FTPAdapter services, aggregator 520 may not inspect the statements in the corresponding artifacts as these services are not of BPEL or ESB type. However, for the services ESB2 and BPEL2, aggregator 520 may again perform the above noted steps and add the other (unmarked) nodes/edges shown in graph 400 of FIG. 4.

Thus, aggregator 520 and crawlers 530A-530B operate together to determine the dependencies (in the form of a graph) for a requested SOA service. The determined dependency information may then be provided to the user, for example, the graph may be displayed to the user. In one embodiment, aggregator 520 stores the determined dependency information in storage 560, as described below with examples.

9. Storing Dependency Information

Referring again to FIG. 5, storage 560 represents a non-volatile storage such as a hard disk in which dependency information is maintained by aggregator 520. The dependency information is stored in the form of a file containing data specified according to GraphML, a open specification for specifying graphs.

A portion of the dependency information (specifying two nodes and a corresponding edge between the nodes) stored according to GraphML is shown below:

It may be observed that the above portion of GraphML specifies two nodes (the "node" tag) corresponding to the services BPEL1 and ESB1. The nodes are also associated with details of the services such as the service name, service type, the URL (EndpointLocation) at which the service can be invoked, etc. The above portion also specifies an edge (the "edge" tag) between the two nodes (based on node ids specified as the source and target) specified earlier. In other words, the above portion of GraphML specifies the nodes 410 and 420 and the corresponding edge 412 in graph 400 of FIG. 4.

The other nodes/edges of graph 400 (representing the dependencies for the specific SOA service BPEL1) may similarly be specified according to GraphML and the corresponding dependency information may be stored in storage 560. Interface 510 may then retrieve the stored dependency information and provide it to the user in response to a request for finding the dependencies of the BPEL1 service. The manner in which interface 510 may provide the dependency information to users is described below with examples.

10. Providing Dependency Information

Figure 6:
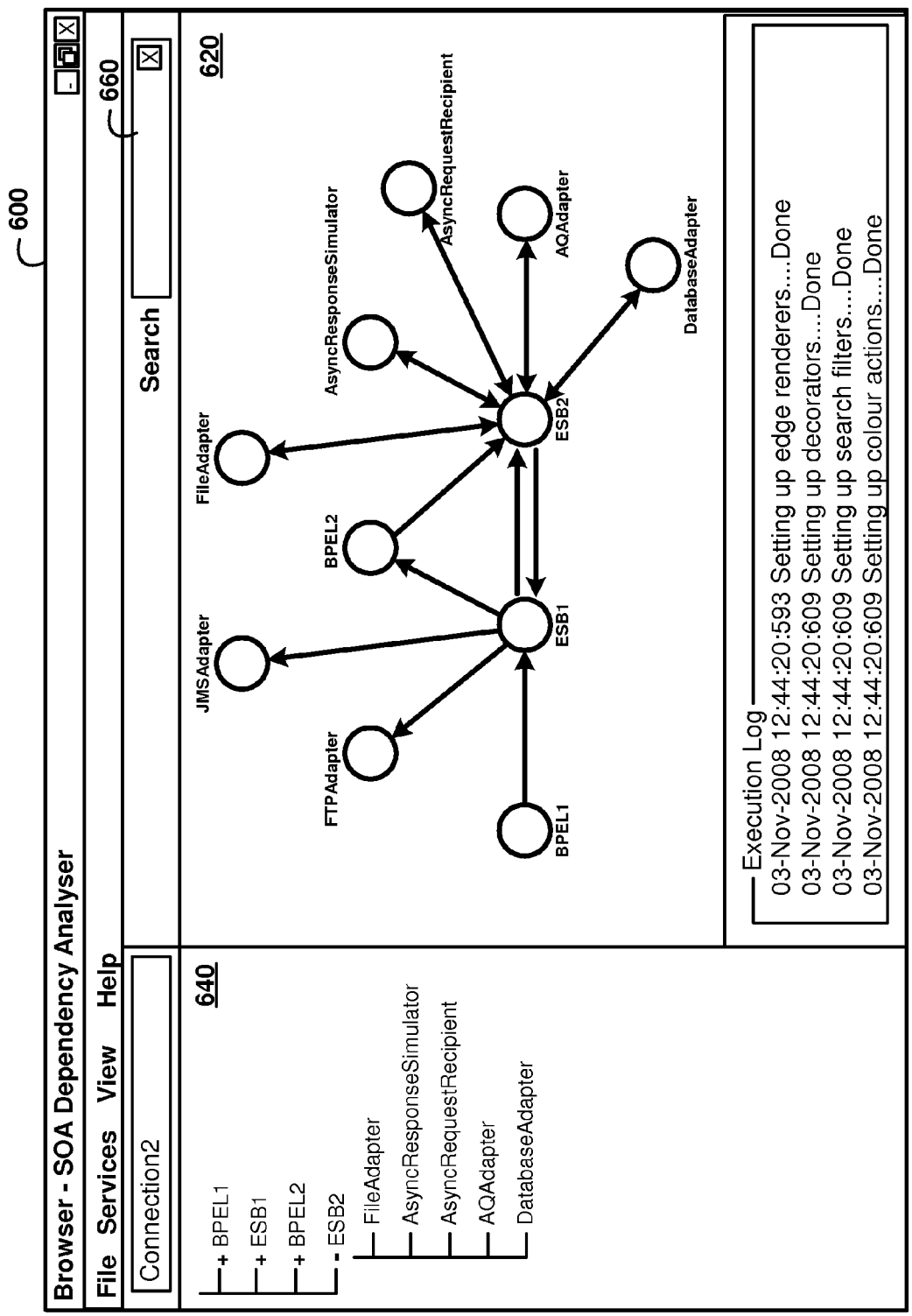
FIG. 6 depicts the manner in which dependencies of a specific SOA service is provided to a user in one embodiment.

FIG. 6 depicts the manner in which dependencies of a specific SOA service is provided to a user in one embodiment. Display area 600 represents a portion of a user interface displayed on a display unit (not shown) associated with a user system (such as 110H) from which the request to find the dependencies of the specific SOA service (assumed to be BPEL1) is received. The user interface of display area 600 may be provided by browser 580 (executing in the user system 110H as shown in FIG. 5) on receiving the dependency information (for example, the data according to the GraphML) from interface 510 as a response to the request.

Display area 620 shows the dependency information in the form of a graph, with the edges of the graph representing the dependencies and the nodes of the graph representing the corresponding services between which the dependencies exist. It may be appreciated that in the scenario that the data according to GraphML (described above) is received as the

```
<graphml>
    <graph edgedefault="directed" id="graphMLs/BPEL1_1_0 Dependency Graph">
    <node                                id="http://sphukan-
lap.idc.oracle.com:8888/orabpel/sCrawler_BPELDomain/BPEL1/1.0/BPEL1?wsdl">
        <data key="Name">BPEL1</data>
        <data key="Description" />
        <data                      key="EndpointLLocation">http://sphukan-
lap.idc.oracle.com:8888/orabpel/sCrawler_BPELDomain/BPEL1/BPEL1?wsdl</data>
        <data key="Type">BPELService</data>
        <data key="ServiceType">BPEL</data>
        <data key="SubServiceType">Process</data>
    </node>
    <node id="http://sphukan-lap.idc.oracle.com:8888/event/sCrawler_ESBSystem/ESB1">
        <data key="Name">ESB1</data>
        <data key="Description" />
        <data                      key="EndpointLLocation">http://sphukan-
lap.idc.oracle.com:8888/esb/wsil/sCrawler_ESBSystem/ESB1?wsdl</data>
        <data key="Type">RoutingService</data>
        <data key="ServiceType">ESB</data>
        <data key="SubServiceType">Service</data>
    </node>
    ...
    <edge                                         source="http://sphukan-
lap.idc.oracle.com:8888/orabpel/sCrawler_BPELDomain/BPEL1/1.0/BPEL1?wsdl"
target="http://sphukan-lap.idc.oracle.com:8888/event/sCrawler_ESBSystem/ESB1">
        <data key="minLength">200</data>
        <data key="MEPEdge" />
        <data key="description">asdad</data>
    </edge>
    ...
    </graph>
</graphml>
``` response, the nodes and edges of the graph may be displayed based on the "node" and "edge" tags specified in the data. Thus, display area 620 is shown displaying graph 400 representing the dependencies of the BPEL1 service.

Though not shown, the interface of display area 620 may enable a user to pan/scroll the display in the horizontal and/or vertical directions, to zoom in/out of specific portions of the graph, to drag and select one or more displayed nodes/edges, etc. The interface of display area 620 may also highlight the immediate neighboring nodes (that are directly dependent) when a user selects a node of the displayed graph. Furthermore, the information (details of the services and/or dependencies) associated with the nodes/edges may be displayed when a user moves the mouse over and/or selects the corresponding node/edge.

Display area 640 shows the BPEL/ESB services that are included in the dependency information. Alternatively, display area 640 may show the BPEL/ESB services that are deployed in a selected one of the SOA frameworks executing in server systems 160A-160N. Text field 660 enables the user to textually search for specific services based on the service name, type, description, etc. Thus, the dependencies of a specific SOA service (BPEL1) are provided to a user, to facilitate the user to perform further analysis of the dependency information.

It should be appreciated that the features described above can be implemented in various embodiments as a desired combination of one or more of hardware, executable modules, and firmware. The description is continued with respect to an embodiment in which various features are operative when the software instructions described above are executed.

11. Digital Processing System

Figure 7:
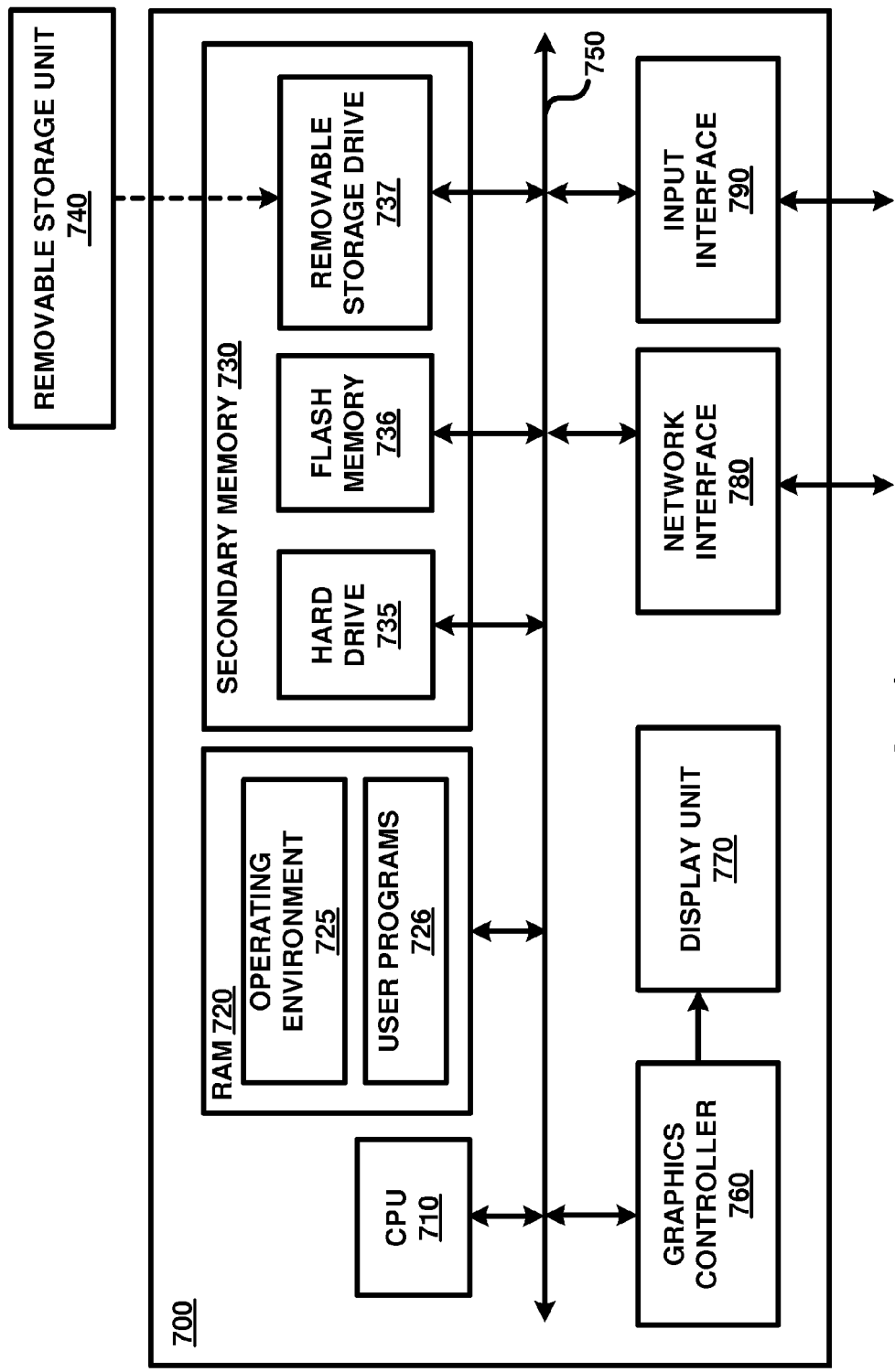
FIG. 7 is a block diagram illustrating the details of a digital processing system in which various aspects of the present invention are operative by execution of appropriate software instructions.

FIG. 7 is a block diagram illustrating the details of digital processing system 700 in which various aspects of the present invention are operative by execution of appropriate software instructions. Digital processing system 700 may correspond to any system executing analysis tool 150.

Digital processing system 700 may contain one or more processors (such as a central processing unit (CPU) 710), random access memory (RAM) 720, secondary memory 730, graphics controller 760, display unit 770, network interface 780, and input interface 790. All the components except display unit 770 may communicate with each other over communication path 750, which may contain several buses as is well known in the relevant arts. The components of FIG. 7 are described below in further detail.

CPU 710 may execute instructions stored in RAM 720 to provide several features of the present invention. CPU 710 may contain multiple processing units, with each processing unit potentially being designed for a specific task. Alternatively, CPU 710 may contain only a single general-purpose processing unit.

RAM 720 may receive instructions from secondary memory 730 using communication path 750. RAM 720 is shown currently containing software instructions constituting shared environment 725 and/or user programs 726 (such as networking applications, database applications, etc.). Shared environment 725 contains utilities shared by user programs, and such shared utilities include operating system, device drivers, virtual machines, flow engine, etc., which provide a (common) run time environment for execution of user programs/applications.

Graphics controller 760 generates display signals (e.g., in RGB format) to display unit 770 based on data/instructions received from CPU 710. Display unit 770 contains a display screen to display the images defined by the display signals. Input interface 790 may correspond to a keyboard and a pointing device (e.g., touch-pad, mouse) and may be used to provide the user inputs required for several aspects of the present invention. Network interface 780 provides connectivity to a network (e.g., using Internet Protocol), and may be used to communicate with other connected systems (such as user systems 110A-110Z, server systems 160A-160N, etc.) of FIG. 1.

Secondary memory 730 may contain hard drive 735, flash memory 736, and removable storage drive 737. Secondary memory 730 may store the data (for example, dependency information according to GraphML, the statements retrieved from the artifacts, etc.) and software instructions (for example, for performing the steps of FIG. 3), which enable digital processing system 700 to provide several features in accordance with the present invention.

Some or all of the data and instructions may be provided on removable storage unit 740, and the data and instructions may be read and provided by removable storage drive 737 to CPU 710. Floppy drive, magnetic tape drive, CD-ROM drive, DVD Drive, Flash memory, removable memory chip (PCMCIA Card, EPROM) are examples of such removable storage drive 737.

Removable storage unit 740 may be implemented using medium and storage format compatible with removable storage drive 737 such that removable storage drive 737 can read the data and instructions. Thus, removable storage unit 740 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 740 or hard disk installed in hard drive 735. These computer program products are means for providing software to digital processing system 700. CPU 710 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method facilitating analysis of dependencies among a plurality of service oriented architecture (SOA) services, said method comprising:
   inspecting statically, using a digital processing system, a plurality of SOA artifacts to determine a set of dependencies among said plurality of SOA services,
   wherein each of said plurality of SOA artifacts, when deployed on a set of SOA server systems provides a corresponding set of SOA services contained in said plurality of SOA services,
   wherein a first SOA service is dependent on a second SOA service if said first SOA service is defined to invoke said second SOA service; and
   providing, using said digital processing system said set of dependencies to a user to facilitate analysis of dependencies among said plurality of SOA services,
   wherein a SOA framework is designed to examine at run time, declarations in deployed SOA artifacts to determine services to be invoked,
   wherein a first SOA artifact of said plurality of SOA artifacts when deployed on said SOA framework provides said first SOA service, wherein said first SOA artifact contains a plurality of declarations,
   wherein said inspecting comprises:
       retrieving said plurality of declarations in said first SOA artifact; and
       parsing said plurality of declarations to identify said first declaration of said plurality of declarations indicating that said second SOA service is designed to be invoked in response to a request for said first SOA service,
       wherein said SOA framework, in view of said first declaration, invokes said second SOA service while processing said request for said first SOA service; and
       including a first dependency in said set of dependencies in response to identifying said first declaration, wherein said first dependency indicates that said first SOA service is dependent on said second SOA service,
   wherein said digital processing system comprises a processor and a memory.

2. The method of claim 1, further comprising receiving a request to provide information on dependencies of a third SOA service, wherein said inspecting and said providing are performed in response to receiving said request.

3. The method of claim 2, wherein said inspecting comprises treating said third SOA service as said first SOA service to identify a dependent SOA service as said second SOA service, and then treating said dependent SOA service as said first SOA service to iteratively determine said set of dependencies of said third SOA service.

4. The method of claim 3, wherein said providing displays said set of dependencies in the form of a graph with each of said set of dependencies being represented as edges between corresponding first SOA service and second SOA service represented as nodes.

5. The method of claim 2, wherein said plurality of declarations are according to eXtended Markup Language (XML), wherein said first declaration is a tag according to said XML.

6. The method of claim 5, wherein said first SOA service is of type ESB (enterprise service bus) service, wherein said tag is a service tag.

7. The method of claim 5, wherein said first SOA service is of type BPEL (business process execution language) service, wherein said tag is a partner link tag.

8. The method of claim 5, wherein said second SOA service is one of type ESB service, BPEL service, web service, and an adapter service.

9. The method of claim 1, further comprising:
   receiving a first request to provide information on dependencies of said first SOA service,
   wherein said digital processing system performs said inspecting of said plurality of SOA artifacts in response to said receiving of said first request to determine that said second SOA service is one of said set of dependencies,
   wherein said providing provides said set of dependencies, including said second SOA service, as a first response to said first request.

10. A non-transitory machine readable medium storing one or more sequences of instructions for causing a system to facilitate analysis of dependencies among service oriented architecture (SOA) services, wherein execution of said one or more sequences of instructions by one or more processors contained in said system causes said system to perform the actions of:
   determining a set of dependencies among a plurality of SOA services, wherein a first SOA service is dependent on a second SOA service if said first SOA service is defined to invoke said second SOA service, wherein said determining comprises inspecting statically a plurality of SOA artifacts to identify each of said set of dependencies,
   wherein each of said plurality of SOA artifacts, when deployed on a set of SOA server systems provides a corresponding set of SOA services contained in said plurality of SOA services; and
   displaying said set of dependencies in the form of a graph with each of said set of dependencies being represented as edges between corresponding SOA services represented as nodes,
   wherein a SOA framework is designed to examine at run time, declarations in deployed SOA artifacts to determine services to be invoked, wherein a first SOA artifact of said plurality of SOA artifacts when deployed on said SOA framework provides said first SOA service, wherein said first SOA artifact contains a plurality of declarations,
   wherein said inspecting comprises:
       retrieving said plurality of declarations in said first SOA artifact; and
       parsing said plurality of declarations to identify a first declaration of said plurality of declarations indicating that said second SOA service is designed to be invoked in response to a request for said first SOA service, wherein said SOA framework, in view of said first declaration, invokes said second SOA service while processing requests for said first SOA service; and including a first dependency in said set of dependencies in response to identifying said first declaration, wherein said first dependency indicates that said first SOA service is dependent on said second SOA service.

11. The non-transitory machine readable medium of claim 10, further comprising one or more instructions for receiving a request to provide information on dependencies of a third SOA service, wherein said inspecting and said providing are performed in response to receiving said request.

12. The non-transitory machine readable medium of claim 11, wherein said inspecting comprises one or more instructions for treating said third SOA service as said first SOA service to identify a dependent SOA service as said second SOA service, and then treating said dependent SOA service as said first SOA service to iteratively determine said set of dependencies of said third SOA service.

13. The non-transitory machine readable medium of claim 12, wherein said plurality of declarations are according to eXtended Markup Language (XML), wherein said first declaration is a tag according to said XML.

14. The non-transitory machine readable medium of claim 10, further comprising:

receiving a first request to provide information on dependencies of said first SOA service, wherein said digital processing system performs said inspecting of said plurality of SOA artifacts in response to said receiving of said first request to determine that said second SOA service is one of said set of dependencies, wherein said providing provides said set of dependencies, including said second SOA service, as a first response to said first request.

15. A digital processing system comprising:
one or more processors;
a random access memory (RAM); and
a computer readable storage medium to store one or more instructions, which when retrieved into said RAM and executed by said one or more processors causes said digital processing system to perform the actions of:
inspecting statically a plurality of SOA artifacts to determine a set of dependencies among said plurality of SOA services, wherein each of said plurality of SOA artifacts, when deployed on a set of SOA server systems provides a corresponding set of SOA services contained in said plurality of SOA services,
wherein a first SOA service is dependent on a second SOA service if said first SOA service is defined to invoke said second SOA service; and
providing said set of dependencies to a user to facilitate analysis of dependencies among said plurality of SOA services,
wherein a SOA framework is designed to examine at run time declarations in deployed SOA artifacts to determine services to be invoked, wherein a first SOA artifact of said plurality of SOA artifacts when deployed on said SOA framework provides said first SOA service, wherein said first SOA artifact contains a plurality of declarations, wherein said inspecting comprises:

retrieving said plurality of declarations in said first SOA artifact; and parsing said plurality of declarations to identify a first declaration of said plurality of declarations indicating that said second SOA service is designed to be invoked in response to a request for said first SOA service, wherein said SOA framework, in view of said first declaration, invokes said second SOA service while processing said request for said first SOA service; and including a first dependency in said set of dependencies in response to identifying said first declaration, wherein said first dependency indicates that said first SOA service is dependent on said second SOA service.

16. The digital processing system of claim 15, further comprising receiving a request to provide information on dependencies of a third SOA service, wherein said inspecting and said providing are performed in response to receiving said request, wherein said inspecting comprises treating said third SOA service as said first SOA service to identify a dependent SOA service as said second SOA service, and then treating said dependent SOA service as said first SOA service to iteratively determine said set of dependencies of said third SOA service.

17. The digital processing system of claim 15, wherein the actions further comprise:

receiving a first request to provide information on dependencies of said first SOA service, wherein said digital processing system performs said inspecting of said plurality of SOA artifacts in response to said receiving of said first request to determine that said second SOA service is one of said set of dependencies, wherein said providing provides said set of dependencies, including said second SOA service, as a first response to said first request.

* * * * *